US008264672B1

(12) United States Patent
Cole

(10) Patent No.: US 8,264,672 B1
(45) Date of Patent: Sep. 11, 2012

(54) VISUALLY DETERMINING FRESNEL ZONE BOUNDARIES IN A DEVICE

(75) Inventor: Joshua R. Cole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 412 days.

(21) Appl. No.: 12/483,278

(22) Filed: Jun. 12, 2009

(51) Int. Cl.
*G01C 3/08* (2006.01)
(52) U.S. Cl. .................................................... 356/4.01
(58) Field of Classification Search .................. 356/4.01
See application file for complete search history.

(56) References Cited

U.S. PATENT DOCUMENTS

| | | | | | |
|---|---|---|---|---|---|
| 2,420,408 | A | * | 5/1947 | Behn | 342/126 |
| 3,798,647 | A | * | 3/1974 | Bailey | 342/458 |
| 3,830,567 | A | * | 8/1974 | Riegl | 356/5.05 |
| 4,509,052 | A | * | 4/1985 | Cash | 342/418 |
| 5,652,588 | A | * | 7/1997 | Miron | 342/58 |
| 5,969,676 | A | * | 10/1999 | Tran et al. | 342/442 |
| 7,202,941 | B2 | * | 4/2007 | Munro | 356/5.01 |
| 7,353,553 | B2 | * | 4/2008 | Huse | 5/653 |
| 7,658,031 | B2 | * | 2/2010 | Cross et al. | 42/142 |

OTHER PUBLICATIONS

Mazar, Hiam, L-O-S Radio Links, Clearnace Above Tall Buildings. Head S-F spectrum & Licensing Division, Ministry of Communications. Isreal, 1991.*
Pie Ling Tee, St. Johns College, St. Lucia, QLD 4067, Austriaia. Bachelors of Engineering Senior Project, Oct. 19, 2001.*
Introduction to Electrodynamics, David J. Griffiths, Third Ed. pp. 390-392, 1999.*

* cited by examiner

*Primary Examiner* — Isam Alsomiri
*Assistant Examiner* — Antoine J Bedard

(57) ABSTRACT

A rangefinder calculates Fresnel zones for a location between the rangefinder and a far-end target. Fresnel zone boundaries are calculated at the location. The boundaries are shown in the viewing interface of the rangefinder. Whenever, the Fresnel zone boundary changes, the radius of the Fresnel zone boundary changes accordingly in the viewing interface. The viewing interface enables a user to view obstacles that appear between the rangefinder and the far-end target and are located within the Fresnel zone boundary.

20 Claims, 5 Drawing Sheets

VISUALLY DETERMINING FRESNEL ZONE BOUNDARIES IN A DEVICE

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, a method for visually determining Fresnel zone boundaries is provided that includes operating a rangefinder to determine a radio frequency line of sight. The radio frequency line of sight is determined between the rangefinder and a target. A location is determined between the rangefinder and the target along the radio frequency line of sight. A first distance is from the rangefinder to the location. A second distance is from the target to the location. Fresnel zones are calculated in the rangefinder for the location. At the location, radii are determined starting at the radio frequency line of sight that respectively corresponds to the Fresnel zones. A circular image, that has one radius of the radii, is superimposed onto a viewing interface of the rangefinder. The circular image is a Fresnel zone boundary.

In a second aspect, a radio frequency (RF) signal Fresnel zone boundary viewing device is provided that includes a line of sight determining component, a user input interface, a processing component, an imaging component, and a display component. The line of sight determining component determines the line of sight between the device and a desired point in the distance for which a user wishes to determine a desired Fresnel zone boundary. The user input interface receives the desired Fresnel zone boundary the user wishes to view and receives a RF signal frequency. The processing component determines desired Fresnel zone boundary attributes. The imaging component creates a visual representation of an environment between the device and the desired point. The display component displays the desired Fresnel zone boundary overlaying the visual representation.

In a third aspect, a system for visually determining Fresnel zone boundaries is provided that includes a rangefinder, with a processor and a memory, that has a range component, a location component, a calculation component, and a visual component that operate together. The range component determines a radio frequency line of sight between the rangefinder and a target. The location component determines a location between the rangefinder and the target along the radio frequency line of sight. A first distance is from the rangefinder to the location. A second distance is from the target to the location. The calculation component calculates Fresnel zones in the rangefinder for the location and determines radii at the location starting at the radio frequency line of sight that respectively corresponds to the Fresnel zones. The visual component superimposes a circular image, that has one radius of the one or more radii, onto a viewing interface of the rangefinder. The circular image is a Fresnel zone boundary.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
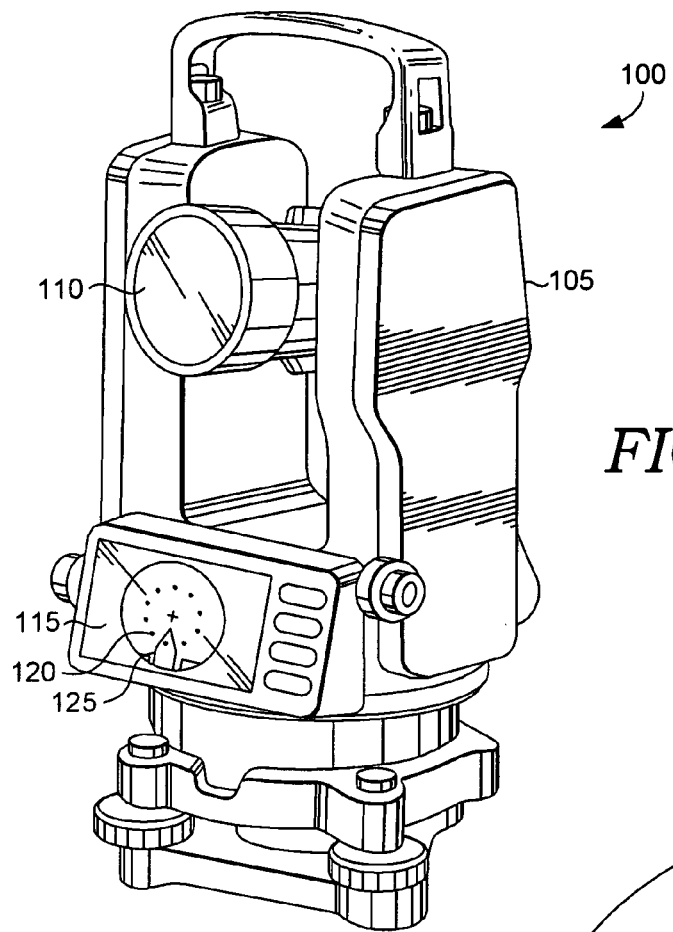
FIG. 1 illustrates an exemplary rangefinder implemented in accordance with an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), magnetic cassettes, magnetic tape, magnetic disk storage, and other magnetic storage devices. These technologies can store data momentarily, temporarily, or permanently.

Fresnel Zones

Implementations of embodiments of the present invention calculate Fresnel zone boundaries and determine if an obstacle will affect the radio waves that travel between two points.

Direct radio waves travel in a straight line from a source transmitter to a target receiver. Some of these radio waves will bump into something and get deflected. Some of the same deflected radio waves may end up at the target receiver. When the deflected radio waves arrive, they may be out of phase with the radio waves that traveled in a straight line to the target receiver. The result is that the deflected radio waves can cause a phase cancelling effect. This phase cancelling effect reduces the power of the arriving signal at the target receiver. The magnitude of the phase cancelling effect is a function of a signal strength and how out of phase is the signal.

A Fresnel zone may be calculated to determine how out of phase the signals are between the source transmitter and the target receiver. Each Fresnel zone is an ellipsoidal shape. Deflections from obstacles that occur anywhere in a first Fresnel zone create signals that will be zero (0) to ninety (90°) degrees out of phase. In a second Fresnel zone, the deflected signals will be 90° to 270° out of phase. In a third Fresnel zone, the deflected signals will be 270° to 450° out of phase, and so on. Even numbered Fresnel zones are considered bad because they have a maximum phase cancelling effect. Odd numbered Fresnel zones are considered good and may actually add to the signal power. The signal strength (and hence the magnitude of the phase cancelling effect) is strongest in the first Fresnel zone and decreases in each successive zone. At any point which is a distance from the source transmitter and a distance from the target receiver, each Fresnel zone has a radius value.

To maximize signal strength received at the target receiver, the effect of the out of phase signals needs to be minimized. Assurances must be provided that the strongest signals are not deflected from anything. The idea here is to insure that there is a maximum chance of getting the signals to the target receiver. The strongest signals are the ones closest to the line of sight between the source transmitter and the target receiver. Consequently, the strongest signals are typically in the first Fresnel zone. A rule of thumb is that sixty percent (60%) of the first Fresnel zone must be clear of obstacles to insure the strongest signals, at the best power, reaches the target receiver. If there is a building that is located at a distance from the source transmitter and located at another distance from the target receiver then the building must not be closer than sixty percent (60%) of the radius measured from a centre line of sight.

Although the building discussed above can be an obstacle, the earth can also become an obstacle where the distance between the source transmitter and the target receiver is great. Such obstacle of the earth typically occurs because of the curvature of the earth and the distance between the source transmitter and the target receiver is greater than three kilometers or approximately two miles. With an implementation of an embodiment of the present invention, a user can determine if the earth's curvature impacts the Fresnel zone boundary. If so, one solution is to raise the height of the antenna at either the source transmitter or the target receiver, or both.

Device with Fresnel Zone Boundaries

An implementation of an embodiment of the present invention is capable of producing accurate results with much less investment of time and effort than the traditional methods of gross surveying, modeling, etc., which are used to establish Fresnel zones and identify potential physical obstructions or interferences to a radio frequency (RF) signal. The embodiment of the present invention uses a visual representation of the calculated Fresnel zone, allowing users with varying degrees of experience to produce meaningful results with little or no help from an experienced user. The implementation of the embodiment of the present invention is portable and usable with minimal setup and configuration required. Further, the implementation of the embodiment of the present invention enables results to be generated faster than the traditional methods used to calculate Fresnel zones. More particular, a device allows the user with minimal relevant knowledge to determine Fresnel zones in a brief time for an RF line of sight between two points.

In an implementation of an embodiment of the present invention, a device implements the features of an electronic range-finding telescope, similar in construction to a theodolite surveying tool. The device has a series of internally projected optical markers arranged in a circular pattern and located on a viewing surface. The optical markers can be contracted and expanded based on input received into the device. The device also has a marker that can be used to assist in determining range. If the distance between two points and a frequency are known, the device can determine the distance and calculate the Fresnel zone using the following formula:

$$F_n = \sqrt{\frac{n \lambda d_1 d_2}{d_1 + d_2}}$$

$F_n$ equals the nth Fresnel zone radius; $d_1$ equals the distance from one end to a point; $d_2$ equals the distance from the other end to the point; and $\lambda$ equals the wavelength of the transmitted signal.

To better understand the present invention, several figures shall be described. In FIG. 1, a device 100 for visually determining Fresnel zone boundaries is provided that includes a rangefinder 105 with a line of sight determiner 110, a viewing interface 115, a Fresnel zone boundary 120, and an obstacle 125. Rangefinder 105 may be similar in scope to surveying tools such as a theodolite surveying tool. Rangefinder 105 is illustrated in one exemplary form but may be implemented in another shape or form. Determiner 110 is part of a component that provides an electronic range-finding telescope function. Determiner 110 is aimed at a target at a distance away from determiner 110. The range of the target away from rangefinder 105 is measured. When the user aims determiner 110 in a particular direction towards the target, the user obtains a visual representation through determiner 110 at viewing interface 115. The user can have several controls on rangefinder 105 to manipulate and alter the visual representation.

The visual representation may include an image seen through determiner 110. The Fresnel zone boundary 120 can overlay the visual representation. The Fresnel zone boundary 120 can take the form in viewing interface 115 as a circular image. The circular image can be a series of points spaced equidistant from the RF line of sight. Or, the circular image can be a circle. Since the Fresnel zone boundary 120 can vary in shape along the RF line of sight. The circular image that is shown in viewing interface 115 is created at a desired point between rangefinder 105 and some end target in the distance. In viewing interface 115, the desired point is shown as obstacle 125.

Obstacle 125 represents an object that appears within the Fresnel zone boundary 120. The user can determine at obstacle 125 the Fresnel zone boundary 120. The Fresnel zone boundary 120 at obstacle 125 takes the shape of the radius that has been calculated for the nth Fresnel zone at obstacle 125. For example, as n changes for the Fresnel zone, the radius for the Fresnel zone boundary 120 also changes. The user may implement the changes to the Fresnel zone in real time by manipulating the controls in rangefinder 105.

Figure 2:
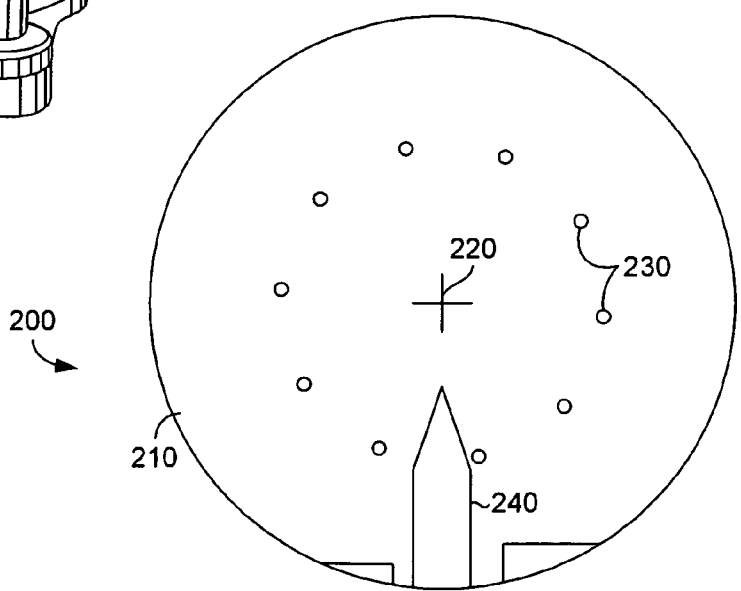
FIG. 2 illustrates an exemplary viewing interface showing a Fresnel zone boundary overlaying a visual representation when implemented in accordance with an embodiment of the present invention.

Turning now to FIG. 2, a Fresnel zone boundary view 200 is shown that represents the same view that was depicted in viewing interface 115. View 200 shows a visual representation 210 that is overlain with a line of sight 220 and a Fresnel zone boundary 230 in a circular shape. In visual representation 210, an obstacle 240 is shown along with other shapes which may be indicative of buildings or natural obstructions.

Line of sight 220 is a linear distance between rangefinder 105 and a target in the distance. The user can determine a range between rangefinder 105 and the target through the electronic range-finding telescoping mechanism in rangefinder 105. The user can aim rangefinder 105 at the target through determiner 110 to calculate the distance between two points along line of sight 220. Typically, once the user determines the two points and calculates lines of sight 220 in rangefinder 105, the user can calculate Fresnel zones to determine if there are any obstacle that might affect RF signals that travel between rangefinder 105 and the target. In visual representation 210, obstacle 240 appears within the Fresnel zone boundary 230 that has been calculated. The user calculates the Fresnel zone boundary 230 at the location along line of sight 220 where obstacle 240 is situated.

Figure 3:
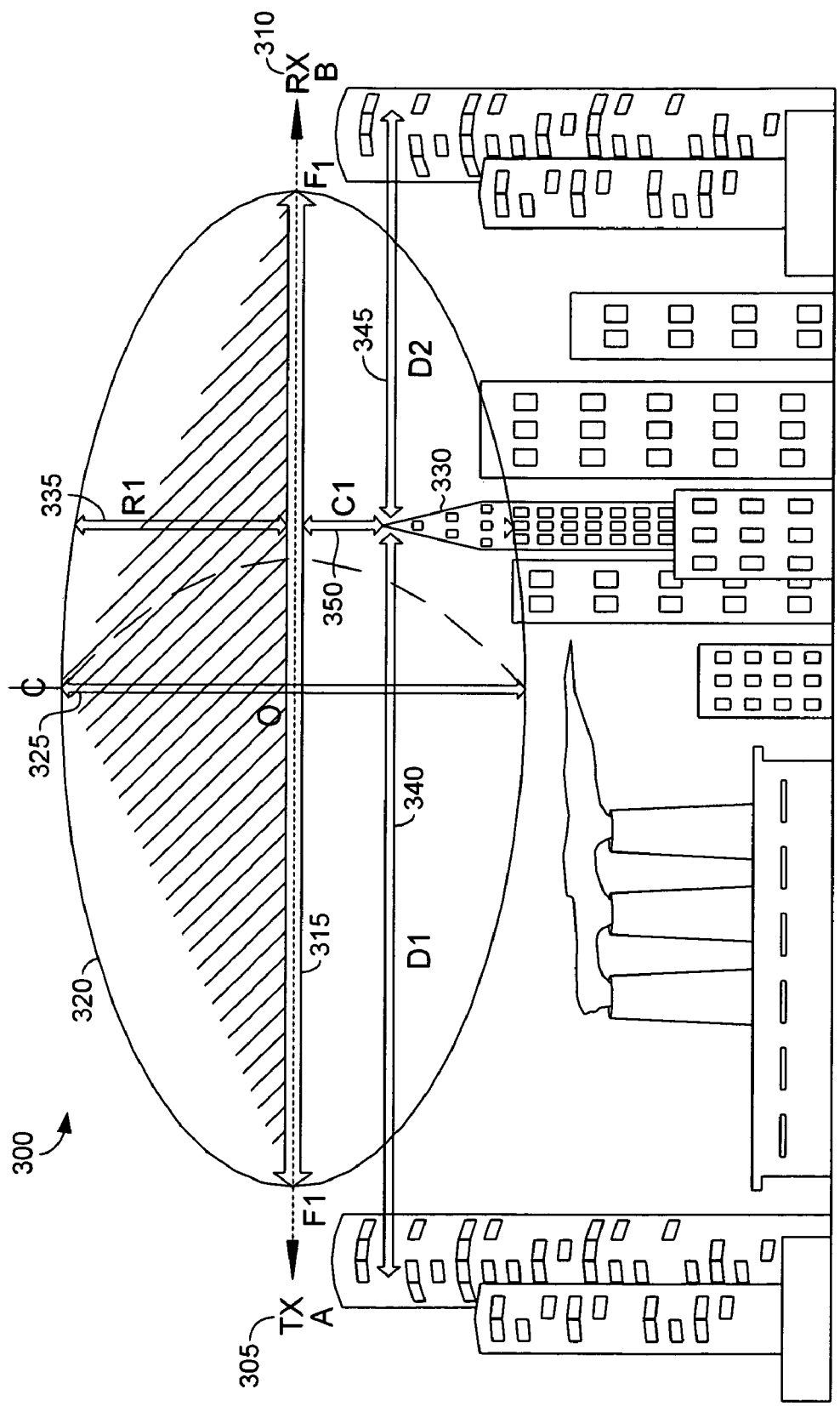
FIG. 3 illustrates a perspective view of determining a Fresnel zone boundary between two points during an implementation of an embodiment of the present invention.

Another way of understanding FIG. 2, is to study FIG. 3. FIG. 3 illustrates a perspective view of what happens between rangefinder 105 and the target discussed in FIGS. 1 and 2. In a perspective 300, a source 305 is shown atop a building. Source 305 is typically rangefinder 105. Perspective 300 also shows a target 310. Target 310 is a location atop a building situated at a distance from source 305. Rangefinder 105 calculates a Fresnel zone 320 between source 305 and target 310 along a line of sight 315. The size and shape of the Fresnel zone 320 may be altered by changing the nth level in the Fresnel zone calculation. Although not shown here, a three-dimensional view of the Fresnel zone 320 looks similar to the shape of a watermelon, a three-dimensional oblong object, or an ellipsoidal. The maximum height of the Fresnel zone 320 is located at a center point 325 which has the largest radius along line of sight 315 that starts at line of sight 315 and reaches to the boundary of the Fresnel zone 320. Center point 325 represents a location that is half-way between source 305 and target 310.

In a typical circumstance, an object usually protrudes within the Fresnel zone boundary that may affect the RF signals that travel between source 305 and target 310. In FIG. 3, an obstacle 330 appears within the Fresnel zone 320. The user that operates rangefinder 105 can calculate the Fresnel zone boundary 230 at obstacle 330. A location 335 is situated above obstacle 330 and has a distance that extends outward from line of sight 315 to the boundary of the Fresnel zone 320. In a three-dimension representation, location 335 acts as a radius that forms a circular image that is the Fresnel zone boundary 230.

The user automatically calculates the Fresnel zone boundary 230 in rangefinder 105. This calculation may occur in the mathematical equation described above. Although not described in detail, rangefinder 105 knows the distance between source 305 and target 310 along line of sight 315. Rangefinder 105 has the maximum radius of the Fresnel zone 230 determined at center point 325. Further, rangefinder 105 can calculate the Fresnel zone boundary 230 at obstacle 330. Rangefinder 105 can determine the Fresnel zone boundary 230 using a first distance 340 which is the distance between source 305 and obstacle 330 and a second distance 345 which is the distance between target 310 and obstacle 330. From the calculations, location 335 is determined giving rise to the Fresnel zone boundary 230 which is shown in FIG. 2. FIG. 2 represents what the user sees in viewing interface 115 at obstacle 330 and location 335.

Another aspect of the implementation of the embodiment of the present invention is that the user my automatically determine if obstacle 330 will affect the RF signals that travel between source 305 and target 310. At a certain height of obstacle 330, the RF signals that bounce off obstacle 330 will not significantly impact the transmission of RF signals. Therefore, rangefinder 105 can determine a height distance 350 which is the distance from line of sight 315 to the top of obstacle 330. Rangefinder 105 can use a ratio of the height distance 350 and location 335 to determine the percentage of obstacle 330 that is within the Fresnel zone boundary 230. In other words, rangefinder 105 can determine how much of obstacle 330 protrudes into the radius located at location 335. Typically, if obstacle 330 takes up forty percent or less of the radius determined at location 335, the transmission of the RF signals between source 305 and target 310 will be fairly good. Stated differently, the user desires that sixty percent of the radius at location 335 be clear of obstacle 330. If this occurs, an implementation of an embodiment of the present invention may have an indicator provided to the user in rangefinder 105 that gives this notice.

Figure 4:
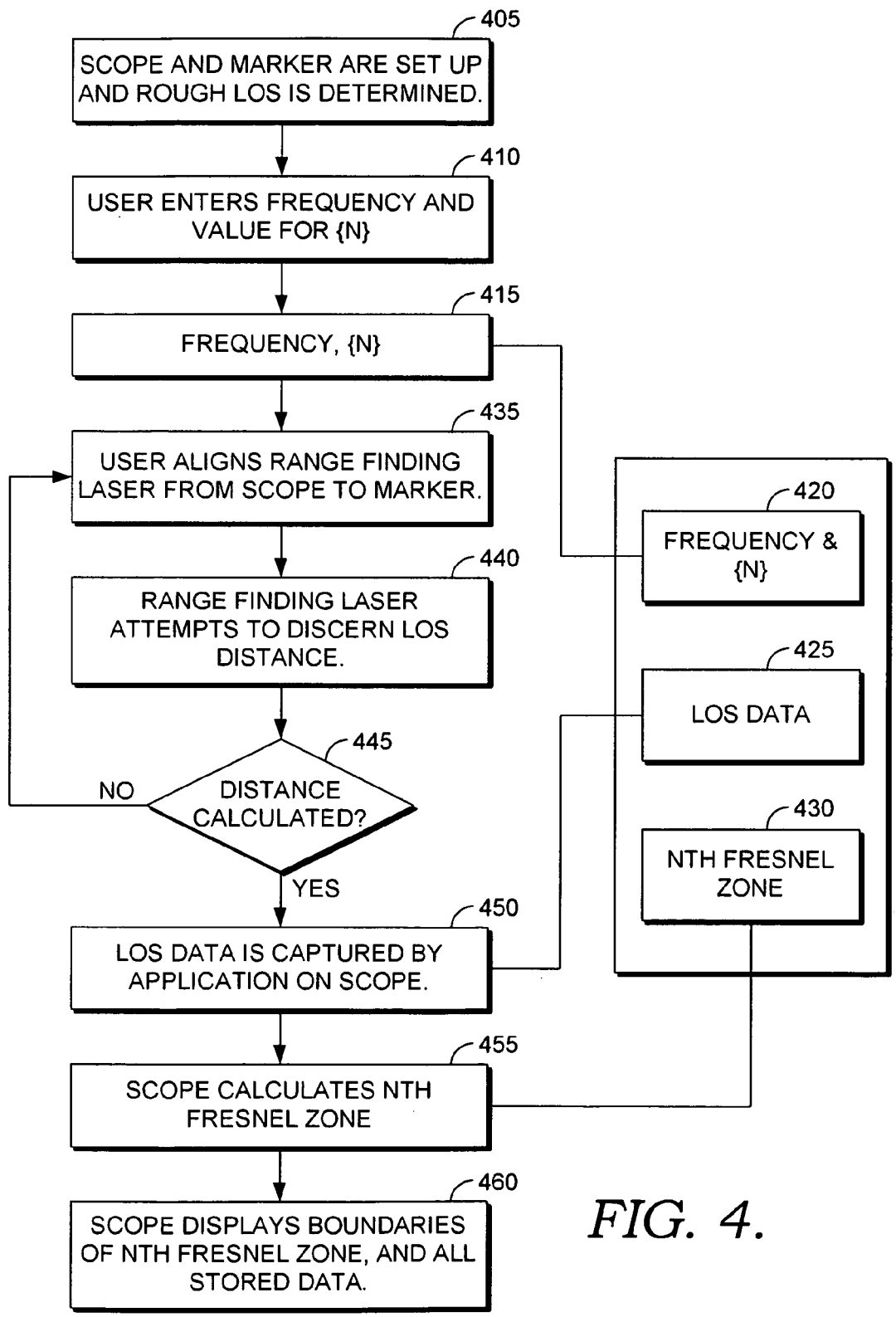
FIG. 4 is a flowchart for determining a Fresnel zone boundary in a device when implementing an embodiment of the present invention.

Turning now to FIG. 4, a process for determining a Fresnel zone boundary in a device is shown in a method 400. In a step 405, rangefinder 105 is used to setup a scope (source 305) and marker (target 310). A rough line of sight (LOS) is also determined. In a step 410, a user enters in rangefinder 105 a frequency and a value for N. N represents the nth Fresnel zone. The identified frequency and value for N in a step 415 may be obtained or provided from steps 420, 425, and 430 which respectively identify the frequency and value for N, LOS data, and nth Fresnel zone. Depending on the implementation of the embodiment of the present invention, steps 420, 425, and 430 may correlate to a database that store information or may correlate to inputs provided by the user.

In a step 435, the user aligns rangefinder 105 with determiner 110 using a range finding laser from the scope to the marker. In a step 440, the range finding laser attempts to discern LOS distance. In a step 445, a determination is made whether the distance is calculated. If the distance is not calculated, the user continues to determine the distance between the scope and marker in step 430. If the distance is calculated, LOS data is captured by an application in rangefinder 105 at the scope in a step 450.

In a step 455, rangefinder 105 at the scope calculates the nth Fresnel zone. In a step 460, rangefinder 105 at the scope displays boundaries of the nth Fresnel zone (the Fresnel zone boundary 230) and all stored data.

Figure 5:
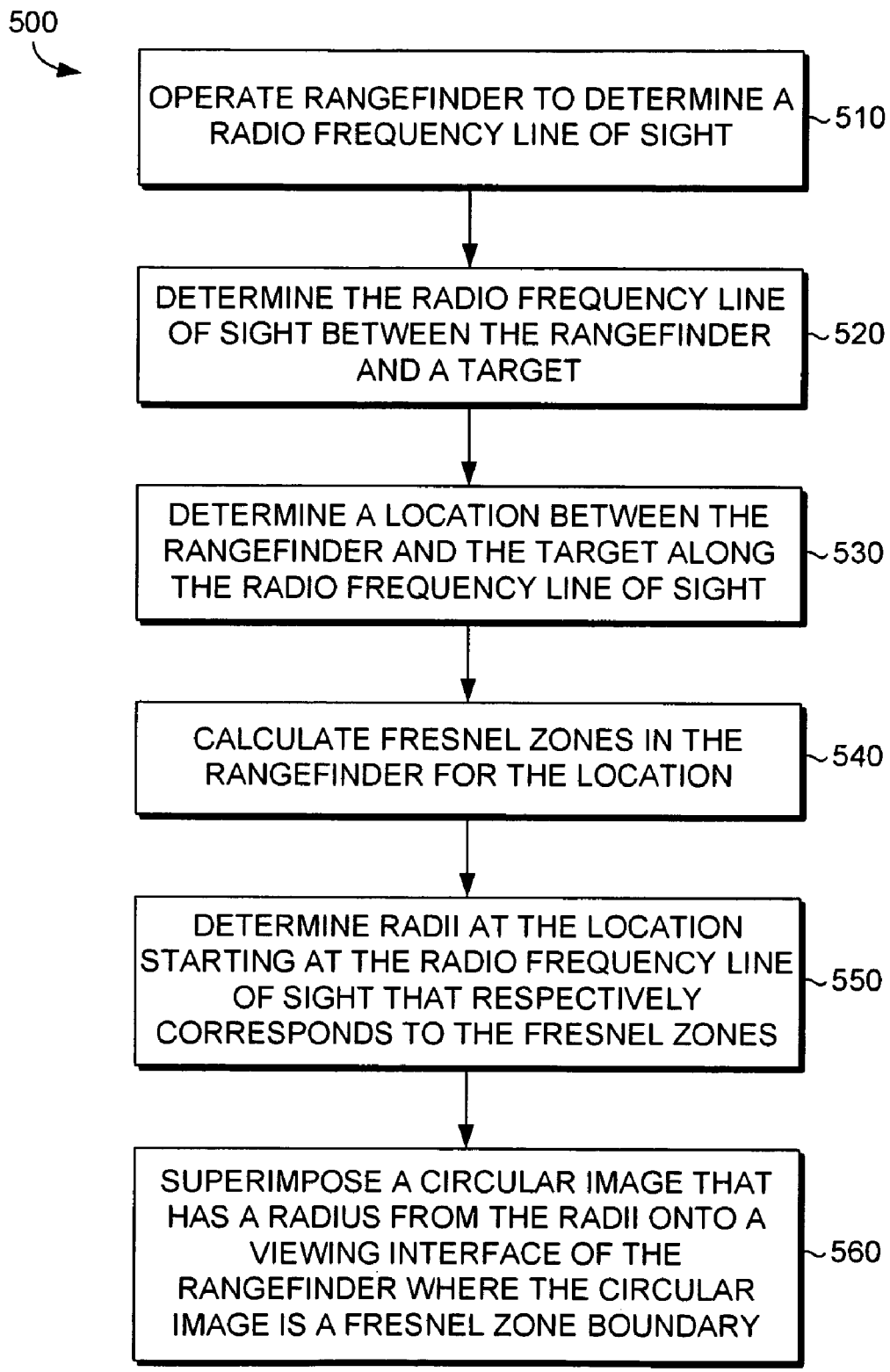
FIG. 5 is a flowchart for determining Fresnel zone boundaries when implementing an embodiment of the present invention.

In FIG. 5, a process for determining Fresnel zone boundaries is shown in a method 500. In a step 510, a user operates rangefinder 105 to determine a radio frequency line of sight 315. In a step 520, the radio frequency line of sight 315 is determined between rangefinder 105 (source 305) and target 310. An exemplary way to determine line of sight is to use an electronic range-finding telescope or an electronic range-finding telescope feature in a device.

In a step 530, a location (obstacle 330) is determined between rangefinder 105 and target 310 along the radio frequency line of sight 315. Fresnel zones are calculated in rangefinder 105 for the location, at a step 540. In a step 550, radii are determined at the location starting at the radio frequency line of sight 315. The various radii correspond respectively to various Fresnel zones. For example, each nth Fresnel zone has a particular radius at a desired point such as at the location or obstacle 330.

In a step 560, a circular image that has a radius from the radii is superimposed or overlain onto viewing interface 115 of rangefinder 105. The circular image is the Fresnel zone boundary 230.

In this specification, the term superimpose or overlain may be used broadly to indicate the depiction of several items brought together visually. For example, the Fresnel zone boundary 230 may overlay visual representation 210. However, the Fresnel zone boundary 230 can be said to overlay viewing interface 115. The idea here is to convey that a calculated Fresnel zone boundary is pictorially shown simultaneously with a visual representation or image that appears.

Together, the Fresnel zone boundary and the visual representation are shown in viewing interface 115.

Figure 6:
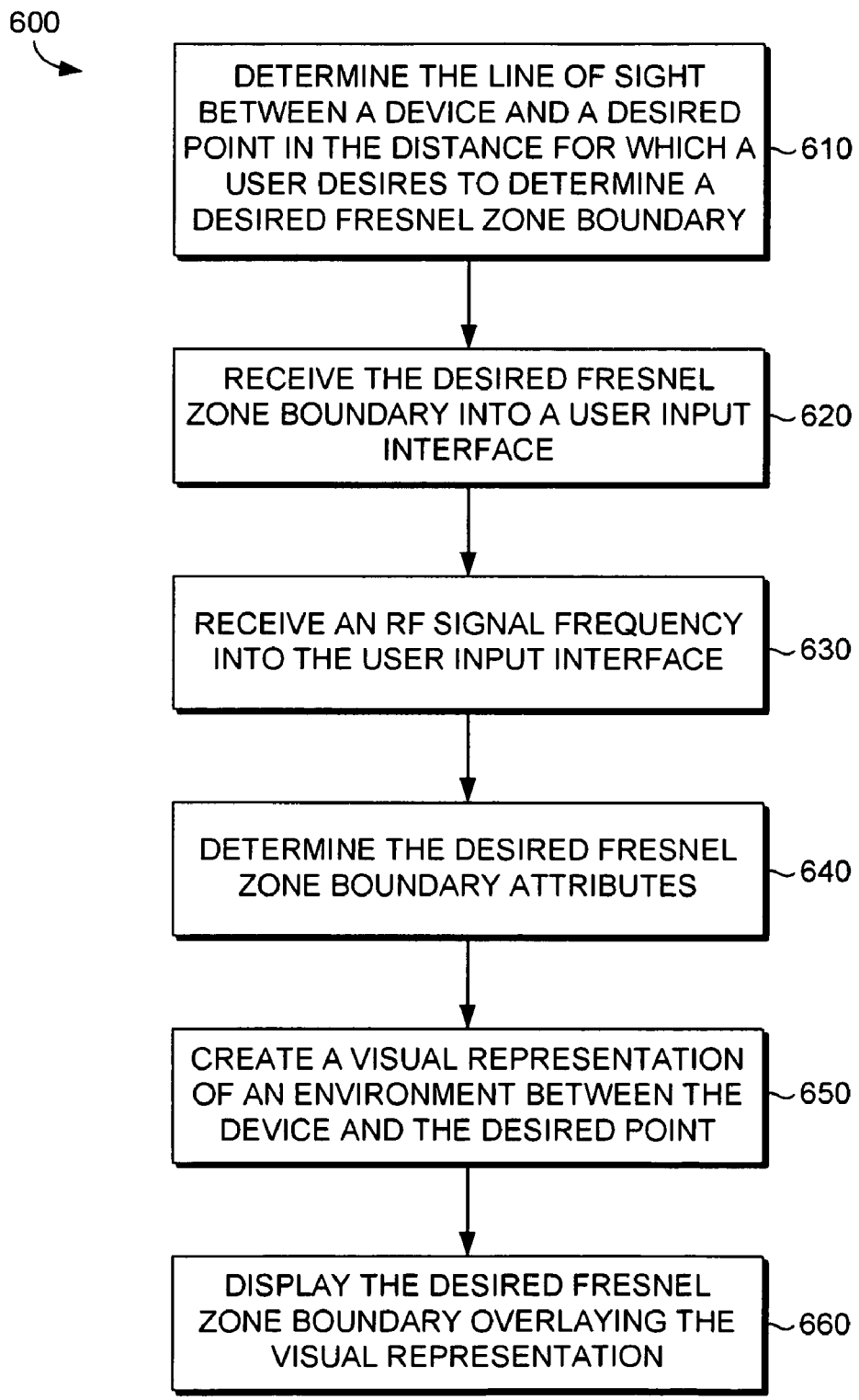
FIG. 6 is another flowchart for determining a Fresnel zone boundary in a device when implementing an embodiment of the present invention.

Turning now to FIG. 6, a process for determining another Fresnel zone boundary in a device is shown in a method 600. Similar to the process described in FIG. 5, in a step 610, a user desires to determine a desired Fresnel zone boundary. The line of sight is determined between a device at a desired point in the distance. In a step 620, the desired Fresnel zone boundary is received into a user input interface on rangefinder 105. At a step 630, an RF signal frequency is also received into the user input interface.

Once the inputs are received, at a step 640, the desired Fresnel zone boundary attributes are determined. In a step 650, a visual representation of an environment is created between the device and the desired point. In a step 660, the desired Fresnel zone boundary is displayed overlaying the visual representation.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for visually determining Fresnel zone boundaries, comprising:
   operating a rangefinder to determine a radio frequency line of sight;
   determining the radio frequency line of sight between the rangefinder and a target;
   determining a location between the rangefinder and the target along the radio frequency line of sight wherein a first distance is from the rangefinder to the location and a second distance is from the target to the location;
   calculating one or more Fresnel zones in the rangefinder for the location;
   determining one or more radii at the determined location starting at the radio frequency line of sight that respectively corresponds to the one or more Fresnel zones; and
   superimposing a circular image, that has one radius of the one or more radii, onto a viewing interface of the rangefinder wherein the circular image is a Fresnel zone boundary.

2. The method of claim 1, wherein the location corresponds to an obstacle that is identifiable in the viewing interface and the obstacle is shown in the viewing interface with the circular image.

3. The method of claim 2, further comprising determining that sixty percent of the radius is clear of the obstacle and providing an indicator in the viewing interface whether sixty percent of the radius is clear of the obstacle.

4. The method of claim 3, further comprising adjusting to another Fresnel zone that results in another circular image, another Fresnel zone boundary, and another radius at the location for the obstacle.

5. The method of claim 4, wherein the viewing interface is selected from a group including a viewfinder and a screen display.

6. The method of claim 5, further comprising providing the Fresnel zone boundary and the indicator faster and in less time than survey methods and modeling techniques used to establish Fresnel zones, identify obstacles, and identify interferences to a signal.

7. A radio frequency (RF) signal Fresnel zone boundary viewing device, the device comprising:
   a line of sight determining component that determines the line of sight between the device and a desired point in the distance for which a user wishes to determine a desired Fresnel zone boundary;
   a user input interface that receives the desired Fresnel zone boundary the user wishes to view and for receives an RF signal frequency;
   a processing component that determines desired Fresnel zone boundary attributes;
   an imaging component that creates a visual representation of an environment between the device and the desired point; and
   a display component that displays the desired Fresnel zone boundary overlaying the visual representation.

8. The device of claim 7, wherein the Fresnel zone boundary attributes comprise at least one of a circular image, a set of points, a radius image, and a radius value.

9. The device of claim 8, wherein the user input interface receives a Fresnel zone boundary for a particular Fresnel zone and a position located between the device and the desired point.

10. The device of claim 9, wherein the imaging component is selected from a group including an imaging device and a video recording device.

11. The device of claim 10, wherein the imaging device is a camera and the video recording device is a video camera.

12. The device of claim 11, wherein the display component is selected from a group including a viewfinder and a screen display.

13. The device of claim 12, wherein the position corresponds to an obstacle within the Fresnel zone boundary and the obstacle is part of the visual representation.

14. The device of claim 13, further comprising the processing component that determines whether sixty percent of the radius value at the position is clear of the obstacle.

15. The device of claim 14, further comprising an indicator displayed by the display component illustrates whether sixty percent of the radius value is clear of the obstacle.

16. The device of claim 15, wherein the line of sight determining component, the user input interface, the processing component, the imaging component, and the display component operate together to provide results faster and in less time than methods used to establish Fresnel zones, identify obstacles, and identify interference to a signal.

17. A system for visually determining Fresnel zone boundaries, comprising:
   a rangefinder, with a processor and a memory, that includes a range component, a location component, a calculation component, and a visual component that operate together;
   the range component that determines a radio frequency line of sight between the rangefinder and a target;
   the location component that determines a location between the rangefinder and the target along the radio frequency line of sight wherein a first distance is from the rangefinder to the location and a second distance is from the target to the location;

the calculation component that calculates one or more Fresnel zones in the rangefinder for the location and determines one or more radii at the location starting at the radio frequency line of sight that respectively corresponds to the one or more Fresnel zones; and the visual component that superimposes a circular image, that has one radius of the one or more radii, onto a viewing interface of the rangefinder wherein the circular image is a Fresnel zone boundary.

18. The method of claim 17, wherein the location corresponds to an obstacle that is identifiable in the viewing interface and the obstacle is shown in the viewing interface with the circular image.

19. The method of claim 18, further comprising the calculation component that determines another Fresnel zone that results in another circular image, another Fresnel zone boundary, and another radius at the location for the obstacle.

20. The method of claim 19, wherein the viewing interface is selected from a group including a viewfinder and a screen display.

* * * * *